Feb. 11, 1969 FUMIO SAKAI ET AL 3,427,100
SMALL-SIZED MOTION-PICTURE PROJECTOR
Filed March 10, 1966
FIG. 1
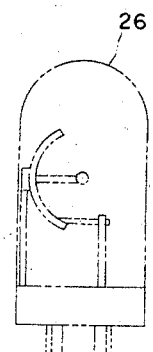
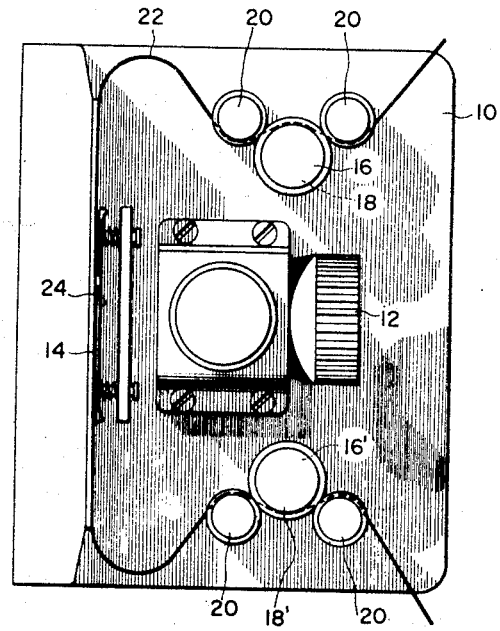
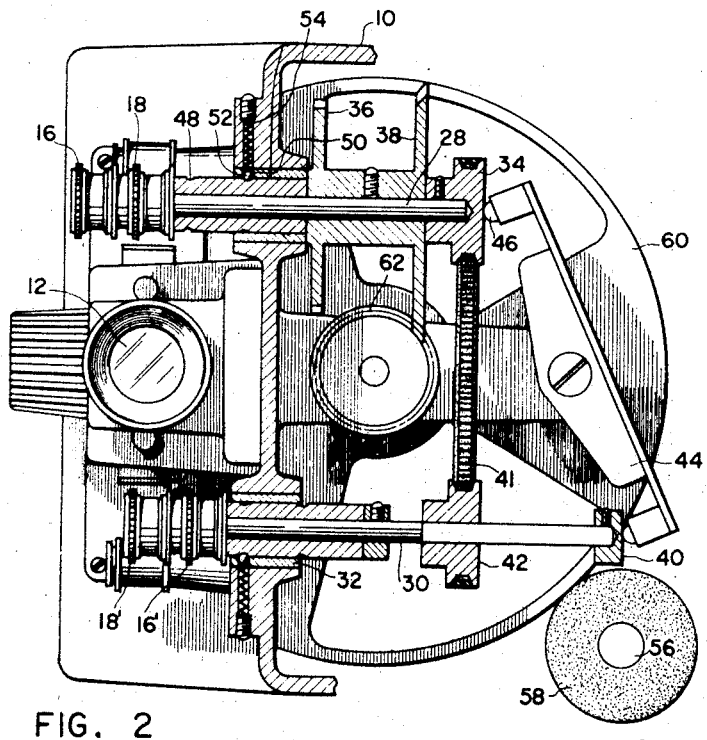
FIG. 2

United States Patent Office 3,427,100
Patented Feb. 11, 1969

3,427,100
SMALL-SIZED MOTION-PICTURE PROJECTOR
Fumio Sakai, Nagoya, and Chihiro Aoki, Aichi-gun,
Japan, assignors to Elmo Company Limited,
Mizuho-ku, Nagoya, Japan
Filed Mar. 10, 1966, Ser. No. 533,203
Claims priority, application Japan, Mar. 31, 1965,
40/18,331
U.S. Cl. 352—79    3 Claims
Int. Cl. G03b 41/00, 21/48

ABSTRACT OF THE DISCLOSURE

A film feed mechanism for selectively projecting two types of 8 mm. wide motion-picture film respectively having slightly different perforation pitch. The device comprises a pair of parallel rotary shafts wherein there are provided on one end portion two pairs of sprocket wheels of substantially equal diameter having different gear teeth ratios corresponding to the respective film perforation pitches. The sprocket wheels are disposed in juxtaposed relationship and in the opposite orders. Upon changing the type of film, the shafts can be manually displaced in axial, opposite directions to put each sprocket wheel on each shaft into corresponding operatively aligned positions while at the same time both shafts are set to be rotated at a common speed suitable for projecting the film involved.

---

This invention relates in general to a small-sized motion-picture projector and more particularly to a film feed mechanism for feeding a length of small-sized motion-picture film at a selected one of two predetermined speeds in accordance with the type of film involved in such a projector.

While the standard type of 8 mm. wide motion-picture film meeting the requirements of the established international standards has been commonly used the same are relatively small in area of picture frame effectively used and/or width of sound track. Various attempts have been previously made to improve the quality of recorded picture and sound until another type of such film has been lately developed increased in both effective picture area and width of sound track by decreasing the space between the perforations or the perforation pitch while maintaining the width of film unchanged.

The latter type of 8 mm. wide motion-picture film just described, however, is impossible to be properly projected by the conventional type of small-sized motion-picture projectors for use with the standard type of 8 mm. wide motion picture film. It is very desirable for a single small-sized motion-picture projector to be capable of selectively projecting both the standard type and the newly developed type of 8 mm. wide motion-picture film.

It is, of course, possible selectively to project the both types of 8 mm. wide motion-picture film as above described by a single small-sized motion-picture projector including two separate film feed mechanisms constructed in accordance with the film format or the mode of film feed and interchangeably connected to the main body of the projector. This measure, however, is disadvantageous in that, since the film feed mechanism includes not only almost all the essential parts of the projector but also many elements troublesome in machining them, the total expense of two film feed mechanisms and the single main projector body is not greatly different from that of two separate motion-picture projectors suitable for use with both types of film respectively, and that troublesome interchange of such mechanisms is required dependent upon the film format of the film involved and so on.

In the 8 mm. wide motion-picture projectors adapted to be selectively used with the both types of 8 mm. wide motion-picture film as above described, especially when a sprocket wheel is used for the purpose of feeding the films, it is required to use the particular sprocket wheel in accordance with the perforation pitch of the film involved. As the simplest procedure, therefore, it may be practiced to provide a pair of different sprocket wheels suitable for use with both types of 8 mm. wide motion-picture film and to incorporate into the film feed mechanism of the projector either of the sprocket wheels in accordance with the type of film used. However, such sprocket wheels should be inevitably different in diameter from each other because of a difference between the perforation pitches for the both types of film. This results in the fact that interchange of the sprocket wheel is necessarily accompanied by simultaneous interchange of a retainer for the sprocket wheel ensuring that the sprocket wheel is properly engaged by the adjacent portion of the film involved. Thus while this measure may appear to be simple in principle it causes the user to encounter extremely difficult and troublesome problems.

Accordingly, it is a general object of the invention to provide an improved small-sized motion-picture projector capable of being selectively used with two types of small-sized motion-picture film slightly different in perforation pitch from each other, in a simple manner.

It is an object of the invention to provide, in an 8 mm. wide motion-picture projector, an improved film feed mechanism including two pairs of sprocket wheels each pair capable of being selectively brought into the operative position through a simple manual operation and simultaneously changing their speed of revolution in accordance with the type of 8 mm. wide motion picture film involved.

According to the invention, there is provided film feed mechanism for use in a small-sized motion-picture projector for selectively projecting two types of small-sized motion-picture film slightly different in perforation pitch from each other, comprising a pair of rotary shafts disposed in spaced parallel relation for axial movement and capable of being driven at a common speed of revolution, and characterized by a pair of sprocket wheels of substantially equal diameter disposed side-by-side on one end portion of each rotary shaft one for each type of film to continuously feed a length of the associated type of motion-picture film, the pair of rotary shafts being manually movable in the axial opposite directions from a first operative position where one of the sprocket wheel pair near to the one end of one of the shaft and one of the sprocket wheel pair remote from the one end of the other shaft are brought into their operative position, to a second operative position where the other sprocket wheel on the one rotary shaft and the other sprocket wheel on the other rotary shaft are brought into their operative position and vice versa, and means responsive to that axial movement of both rotary shafts to change the common speed of the rotary shafts so as to drive the pair of sprocket wheels in their operative position at a speed prescribed to the type of film to be projected.

The invention will become more readily apparent from the following detailed description taken in conjunction with the accompanying drawings in which:

FIG. 1 is a fragmental side elevational view of a small-sized motion-picture projector embodying the principle of the invention;

FIG. 2 is a longitudinal sectional view, partly in elevation of a film feed mechanism constructed in accordance with the invention and illustrated in one of its two operative positions;

Figure 3:
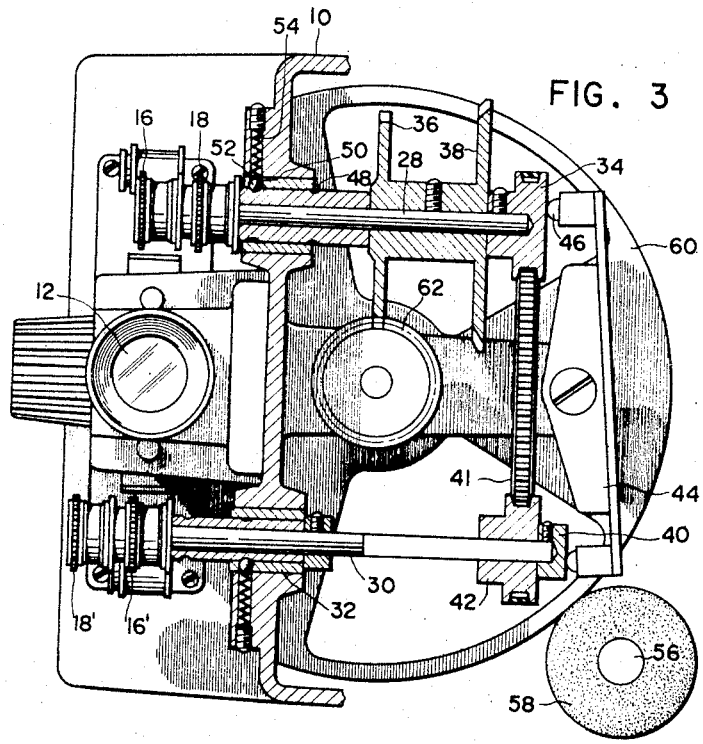
FIG. 3 is a view similar to FIG. 2 but illustrating the film feed mechanism in the other operative position.
Figure 4:
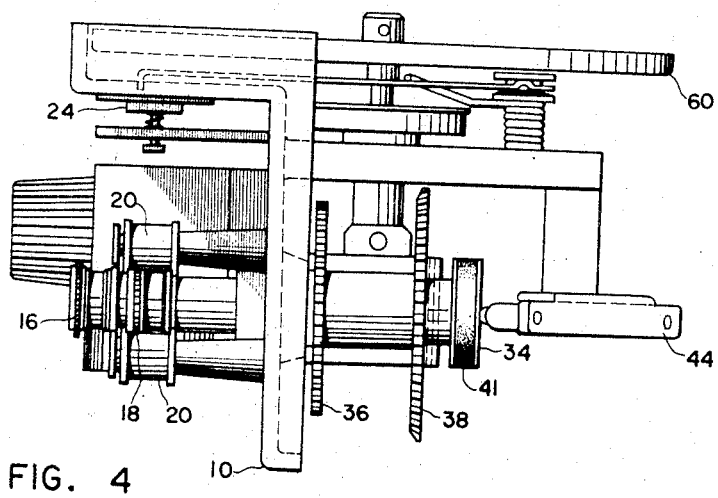
FIG. 4 is a top end view of the film feed mechanism illustrated in FIGS. 2 and 3.

The invention is based upon the principle that, in order to selectively feed two types of 8 mm. wide motion-picture film slightly different in perforation pitch from each other, the tooth numbers for a pair of sprocket wheels for selectively feeding lengths of such different types of film are selected to allow both sprocket wheels to be substantially equal in diameter to each other while the selection of the sprocket wheels in accordance with the type of motion-picture film involved results in a selected one of the sprocket wheels being ready for rotation at a predetermined speed suitable for feeding the length of that type of film. In this connection, it is to be noted that the conventional push rollers or retainers for forcing the motion-picture film against the associated sprocket wheels remain unchanged with the result that through a simple manual operation the operator can select one of the sprocket wheels as well as the speed of revolution of the selected sprocket wheel in accordance with the type of 8 mm. wide motion-picture film involved.

Referring now to the drawings, there is a small-sized motion-picture projector constructed in accordance with the invention. An arrangement illustrated comprises a projector frame generally designated by the reference numeral 10, and having disposed therein the essential part of the projector such as a photographic objective 12, a film gate 14 aligned with the photographic objective 12, a pair of sprocket wheels 16 and 16' or 18 and 18' disposed above and below the objective to feed continuously a length of 8 mm. wide motion-picture film 22, a plurality of pressure rollers 20, in this case two rollers for maintaining the film 22 in engagement with the associated sprocket wheels and a mechanism for intermittently feeding the length of film respectively (not shown), etc.

The length of 8 mm. wide motion-picture film 22 is passed from a supply reel (not shown) through between the upper sprocket wheel 16 or 18 and the associated pressure rollers 20 and thence past the film gate 14 while being pressed against toward the gate by a pressure device 24. The film leaving the film gate 14 travels along a path defined by the lower pressure rollers 20 and the lower sprocket wheel 16' or 18' until it is wound about a taking up reel (not shown). That portion of the length of film moving past the film gate 14 is subject to light from a source of light 26 shown as being disposed on that side of the film gate opposite to the objective 12 and externally of the frame 10 thereby to be focused on a projection screen (not shown) by the objective 12.

According to the invention, a pair of upper and lower rotary sprocket shafts 28 and 30 extend movably in the longitudinal direction and in parallel relationship through the respective sleeves 32 fixedly secured through the frame 10. The upper and lower sprocket shafts 28 and 30 each are provided on one end portion projecting externally of the frame 10 with a pair of sprocket wheels 16 and 18 or 18' and 16' substantially equal in outside diameter to each other and disposed side-by-side thereon. The outer sprocket wheel 16 or the wheel near to the one end of the upper sprocket shaft 28 is adapted to cooperate with the inner sprocket wheel 16' or the wheel remote from the one end of the lower sprocket shaft 30 to feed one of the both types of motion-picture film as previously described while the inner sprocket wheel 18 on the upper sprocket shaft 28 adapted to cooperate with the outer sprocket wheel 18' on the lower sprocket shaft 30 to feed the other type of motion-picture film as will be described hereinafter.

The upper sprocket shaft 28 has a pulley 34 fixed at the other end disposed within the frame 16 and a pair of spaced worm gears 36 and 38 fixedly secured thereon between the frame and the pulley 32. The lower sprocket shaft 30 has the other end portion of square cross section at the end of which a collar 40 is fixed for the purpose as will be apparent hereinafter. The lower shaft 32 has also a pulley 42 similar to the pulley 34 and mounted on the square end portion for axial movement but against rotational movement relative to the shaft. The pulley 42 is arranged to be always aligned with the pulley 34 and operatively coupled to the latter through a slipless transmission member such as an endless timing belt 41 (see FIGS. 2 and 3).

As previously described, each of the two juxtaposed sprocket wheels on each sprocket shaft on one side is adapted to cooperate with the other sprocket wheel on the other sprocket shaft on the opposite side. For this reason, the invention contemplates to move simultaneously the pair of sprocket shafts 28 and 30 in the axial opposite directions to put alternately a pair of cooperating sprocket wheels into their operative position where they are aligned in a common plane with each other. To this end, a lever member 44 is pivotably mounted at the central portion on a suitable stationary part on the frame 10 and has a pair of push elements each made of a steel ball 46 at both ends engaging the pulley 34 and the collar 40 on the pair of sprocket shafts 28 and 30. When the lever member 44 is in its position shown in FIG. 2 the upper sprocket shaft 28 is maintained in its projecting position while the lower sprocket shaft 30 is maintained in its retracted position, whereby the inner sprocket wheel 18 on the upper sprocket shaft 28 is aligned with the outer sprocket wheel 18' on the lower shaft 30. On the other hand, with the lever member 44 in its position in FIG. 3 the upper sprocket shaft 28 is maintained in its retracted position while the lower sprocket shaft 30 is maintained in its projecting position whereby the outer sprocket wheel 16 on the upper shaft 28 is aligned with the inner sprocket wheel 16' on the lower shaft 30.

In order to locate selectively and precisely the pair of sprocket shafts 28 and 30 in either of the two operative positions just described, both shafts each are provided on that portion engageable by the respective sleeve 32 with a pair of circumferential or annular grooves 48 disposed at predetermined axial intervals substantially equal to the central distance between the pair of juxtaposed sprocket wheels on each shaft. Each sleeve 32 then is provided on one end portion, in this case that end portion near the sprocket wheels with a radial hole 50 communicating with a hole extending through the adjacent portion of the frame 10. A steel ball 52 is fitted into the radial hole 50 and forced in engagement with either of the two circumferential grooves 48 on the associated sprocket shaft 28 or 30 by the action of a spring 54 fitted into the hole communicating with that radial hole 50.

In order to drive the pair of sprocket shafts, a drive shaft 56 for a driving electric motor (not shown) has fixed thereon a pulley 58 engaging a shutter plate 60. The shutter plate 60 has disposed at the center a worm 62 meshable with either of the worm gears 36 and 38 in accordance with the operative position of the sprocket shaft.

With the sprocket shafts 28 and 30 in their respective positions illustrated in FIG. 2, the upper ball 52 engages the inner groove 48 on the upper sprocket shaft 28 while the lower ball 50 engages the outer groove 46 on the lower sprocket shaft 30 whereby the both shafts are maintained in their positions illustrated in FIG. 2 where the inner sprocket wheel 18 is on the upper shaft 28 is aligned with the outer sprocket wheel 18' on the lower shaft 30. At the same time, the worm gear 38 meshes the worm 62. Under these circumstances, rotational movement of the motor shaft 54 caused by a drive such as an electric motor (not shown) is transmitted through the pulley 58 to the shutter plate 60 for the purpose of intermittently feeding a length of one type of 8 mm. wide motion-picture film and exposing it to light in the conventional manner. In addition the worm 62 on the shutter plate 60 is rotated to cause the upper sprocket shaft 28 and hence the sprocket wheels 16 and 18 to rotate through the worm gear 38 now meshing the same at a constant speed determined by the transmission gear ratio between the worm gear 62 and the worm gear 38. Rotational movement of the upper shaft 28 causes rotational movement of the lower sprocket shaft 30 and hence the sprocket wheels 16' and 18' through the pulley 34, the endless belt 41 and the pulley 42 at the same speed as the upper shaft 20 and the wheels 16 and 18, whereby the upper and lower sprocket wheels 18 and 18' aligned with each other to continuously feed the length of motion-picture film at a speed prescribed to the one type of film and in synchronization with the intermittent feed of the film.

If it is desired to use the other type of motion-picture film, that side of the upper sprocket shaft 28 on which the sprocket wheels are disposed can be manually pushed into its retracted position or in its position illustrated in FIG. 3. This displacement of the upper shaft causes the lower shaft 30 to be moved into its projecting position or into its position illustrated in FIG. 3 through the action of the lever 44. In this position the outer sprocket wheel 16 on the upper shaft 28 and the inner sprocket wheel 16' on the lower shaft 30 are brought into their operative positions where they are aligned with each other and serve to continuously feed the other type of film. At the same time, the worm gear 36 meshes the worm 62. Under these circumstances, it will be appreciated that rotational movement of the motor shaft 56 causes a length of the other type of motion-picture film to be continuously fed in the same manner as above described except for a speed prescribed to that type of film and determined by the transmission gear ratio between the worm 62 and the worm gear 36.

With the components in the positions illustrated in FIG. 3, the side of the lower sprocket shaft 30 on which the sprocket wheels are disposed may be manually pushed to return the components back to their positions illustrated in FIG. 2.

As an example, it is asumed that the standard and other types of 8 mm. wide motion-picture film have a ratio of perforation pitch of 9:10 and that the pair of sprocket wheels 16 and 16' are used to feed the standard type of film whereas the pair of sprocket wheels 18 and 18' are used to feed the other type of film. Under these circumstances, the sprocket wheels 16 and 16' may have twenty teeth formed on the periphery of each wheel. Then another pair of sprocket wheels 18 and 18' should have eighteen teeth formed on the periphery of each wheel, assuming that both pairs of sprocket wheels are the same in diameter. Further the respective transmission gear ratios between the two worm gears 34 and 36 and the worm 62 are selected to make a ratio between the members of revolution of the sprocket shafts in its one position where the sprocket wheels 16 and 16' are put in operation and in its second position where the sprocket wheels 18 and 18' are in operation equal to 9:10.

While the invention has been described under the assumed condition, that the ratio perforation pitch is equal to a ratio between two simple integers such as the integers 9 and 10. It is to be understood that the invention is equally applicable to any ratio of perforation pitch not exactly equal to a ratio between two integers higher than 10. This is because the sprocket wheels on each of the sprocket shafts are not required to be exactly equal in diameter to each other for the practical purposes. In the latter case, the tooth numbers for the pair of sprocket wheels on a common shaft may be determined to cause that pair of sprocket wheels to have the respective diameter approximately equal to each other and then the transmission ratio is determined upon the basis of the principle of the invention as above described.

Although interchange of the sprocket wheels is, of course, accompanied by a change in a length of stroke of a feed claw for intermittently feeding a length of 8 mm. wide motion-picture and/or a variation in film gate.

To this end, any suitable means may be provided such as displacement of a fulcrum of the claw and selective use of two aperture plates different in film aperture. However, such means do not form a part of the invention and need not be further described.

While the invention has been shown and described with reference to a preferred embodiment thereof, it is to be understood that various changes in the details of construction and the combination and arrangement of parts may be resorted to without departing from the spirit and scope of the invention.

What we claim is:

1. In a small-sized motion-picture projector for selectively projecting two types of small-sized motion-picture film slightly different in perforation pitch from each other, a film feed mechanism comprising a pair of rotary shafts disposed in spaced parallel relationship for axial shiftable movement and capable of being driven at a common speed of revolution, a pair of sprocket wheels of substantially equal diameter disposed side-by-side in outboard and inboard fashion on the same given end portion of each of said rotary shafts, said pair of wheels on each of said rotary shafts including one for driving each of a different type of associated film length and having different gear teeth ratios, said wheels being mounted on the respective shafts in reverse relationship to each other and to said given end of each shaft, said pair of rotary shafts being manually movable in the axial opposite directions from a first operative position where the outboard one of said sprocket wheel pair on the outboard end of said shafts and the reversely positioned inboard corresponding wheel of the other pair of wheels on the other rotary shaft are brought into their respective operatively aligned positions to a second operative position where the other inboard of said first pair of sprocket wheels on the one rotary shaft and the other outboard sprocket wheel on the other rotary shaft are brought into their respective operatively aligned positions, and means responsive to said axial movement of said rotary shafts to change the common speed of revolution of said rotary shafts so as to drive the aligned pairs of sprocket wheels in their respective operative positions at a speed prescribed to the type of film to be projected.

2. In a small-sized motion-picture projector for selectively projecting two types of small-sized motion-picture film slightly different in perforation pitch from each other, a film feed mechanism comprising a pair of rotary shafts disposed in spaced parallel relationship for axial shiftable movement, a pair of sprocket wheels substantially equal in diameter disposed side-by-side in outboard and inboard fashion on the same given one end portion of each of said rotary shafts, said pair of wheels on each of said rotary shafts including one for driving each of a different type of associated film length and having different gear teeth ratios, said wheels being mounted on the respective shafts in reverse relationship to each other and to said given end of each shaft, said pair of rotary shafts having a first operative position where the outboard one of said sprocket wheels on the outboard end of one of said rotary shafts and the reversely positioned inboard corresponding wheel of the other pair of wheels on the other rotary shaft are brought into the operatively aligned positions, and a second operative position where the other inboard wheel of the first pair of sprocket wheels on the one rotary shaft and the other outboard sprocket wheel on the other rotary shaft are brought into their respective operatively aligned positions, a drive transmission means comprising a pulley fixed on the other inboard end of the first-mentioned one of said rotary shafts and another pulley disposed on the other rotary shaft for axial movement but against rotational movement relative to the shaft and a coupling member operatively coupling both pulleys to drive said pair of rotary shafts at a common speed, a lever member for transmitting axial movement of one of said rotary shafts in one direction to the other rotary shaft to move the latter in the opposite direction, and a pair of gear members disposed in spaced relationship on said first-mentioned rotary shaft and engageable respectively with a mating gear element driven by said drive to change the drive speed of said rotary shafts from one predetermined value to another, the arrangement being such that manually operated axial movement of one of said rotary shafts from the one operative position to the operative position in one direction causes axial movement of the other rotary shaft in the opposite direction responsive to the action of said lever means to bring the selected mated corresponding sprocket wheels in their operatively aligned positions while at the same time the drive speed of said pair of rotary shafts is changed from one of the predetermined values to the other.

3. A film feed mechanism as claimed in claim 2, comprising positioning means for maintaining said pair of rotary shafts in either of said operative positions.

References Cited
UNITED STATES PATENTS

| | | | |
|---|---|---|---|
| 1,248,587 | 12/1917 | Workman | 352—79 |
| 1,972,555 | 9/1934 | Fear | 352—80 X |
| 1,984,264 | 12/1934 | Gualtierotti | 352—80 X |
| 2,144,210 | 1/1939 | Vollenweider | 352—80 X |

JULIA E. COINER, *Primary Examiner.*

U.S. Cl. X.R.

352—180